(12) United States Patent
Inoue

(10) Patent No.: US 9,142,029 B2
(45) Date of Patent: Sep. 22, 2015

(54) REGION EXTRACTION APPARATUS, METHOD AND PROGRAM

(71) Applicant: FUJIFILM Corporation, Tokyo (JP)

(72) Inventor: Tsutomu Inoue, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 190 days.

(21) Appl. No.: 14/020,722

(22) Filed: Sep. 6, 2013

(65) Prior Publication Data

US 2014/0079306 A1    Mar. 20, 2014

(30) Foreign Application Priority Data

Sep. 14, 2012  (JP) ................................. 2012-202432
Jun. 12, 2013  (JP) ................................. 2013-123387

(51) Int. Cl.
*G06K 9/00* (2006.01)
*G06T 7/00* (2006.01)

(52) U.S. Cl.
CPC ..... *G06T 7/0083* (2013.01); *G06T 2207/10081* (2013.01); *G06T 2207/10088* (2013.01); *G06T 2207/20021* (2013.01); *G06T 2207/30061* (2013.01); *G06T 2207/30064* (2013.01)

(58) Field of Classification Search
USPC .................................................. 382/128–134
See application file for complete search history.

(56) References Cited

U.S. PATENT DOCUMENTS

| | | | |
|---|---|---|---|
| 6,246,784 B1 * | 6/2001 | Summers et al. ............. | 382/128 |
| 2001/0031920 A1 * | 10/2001 | Kaufman et al. ............. | 600/431 |
| 2005/0107679 A1 * | 5/2005 | Geiger et al. ................. | 600/407 |
| 2005/0123181 A1 * | 6/2005 | Freund et al. ................. | 382/128 |
| 2005/0240094 A1 * | 10/2005 | Pichon et al. ................. | 600/407 |
| 2006/0281987 A1 * | 12/2006 | Bartesaghi et al. ........... | 600/410 |

(Continued)

FOREIGN PATENT DOCUMENTS

| | | |
|---|---|---|
| EP | 2 375 379 A2 | 12/2011 |
| JP | 2008-142481 A | 6/2008 |

(Continued)

OTHER PUBLICATIONS

Shiying, Automatic Lung Segmentation for Accurate Quantitation of Volumetric X-Ray CT Images, Jun. 6, 2001, IEEE Transaction on Medical Image, vol. 20.*

(Continued)

*Primary Examiner* — Alex Liew
(74) *Attorney, Agent, or Firm* — McGinn IP Law Group, PLLC

(57) ABSTRACT

A three-dimensional medical image obtainment unit that obtains a three-dimensional medical image of a chest, a bronchial structure extraction unit that extracts a bronchial structure from the three-dimensional medical image, a divided lung region obtainment unit that divides, based on the divergence of the bronchial structure, the bronchial structure into plural bronchial structures, and obtains plural divided lung regions based on the plural divided bronchial structures, a distance image generation unit that generates, based on the plural divided lung regions, a distance image based on a distance between each voxel in an entire region excluding at least one of the plural divided lung regions and each of the plural divided lung regions, and a border non-existing region extraction unit that extracts, based on the distance image generated by the distance image generation unit, a border non-existing region, which does not include any borders of the divided lung regions, are provided.

11 Claims, 7 Drawing Sheets

(56) References Cited

U.S. PATENT DOCUMENTS

| | | | |
|---|---|---|---|
| 2007/0024617 A1* | 2/2007 | Poole | 345/424 |
| 2007/0071301 A1* | 3/2007 | Kiraly et al. | 382/131 |
| 2007/0092864 A1* | 4/2007 | Reinhardt et al. | 435/4 |
| 2008/0101675 A1* | 5/2008 | Guiliguian et al. | 382/131 |
| 2011/0135172 A1* | 6/2011 | Kitamura | 382/128 |
| 2011/0243403 A1* | 10/2011 | Mizuno | 382/128 |
| 2014/0079306 A1* | 3/2014 | Inoue | 382/131 |

FOREIGN PATENT DOCUMENTS

| | | |
|---|---|---|
| JP | 2011/212313 A | 10/2011 |
| JP | 2012-045256 A | 3/2012 |

OTHER PUBLICATIONS

P. Lo et al., "A Bottom-up approach for labeling of human airway trees", Fourth International Workshop on Pulmonary Image Analysis, pp. 23-34, 2011.

J. Lee et al., "Bronchial Segment Matching in Low-dose Lung CT Scan Pairs", Medical Imaging 2009: Computer-Aided Diagnosis, Proceeding of SPIE, vol. 7260, pp. 72600A1-72600A8.

Japanese Office Action dated Sep. 30, 2014 with a partial English translation thereof.

* cited by examiner

FRONT

REAR

REGION EXTRACTION APPARATUS, METHOD AND PROGRAM

BACKGROUND OF THE INVENTION

1. Field of the Invention

The present invention relates to a region extraction apparatus, method and program for extracting a region, such as a lung lobe, from a three-dimensional medical image of a chest. In particular, the present invention relates to a region extraction apparatus, method and program for extracting a border of the region, such as a lung lobe.

2. Description of the Related Art

In a surgery of a lung cancer or the like, it is important to recognize interlobar fissures, which are present between lung lobe regions, and borders of lung segments to conserve pulmonary functions after the surgery and to maintain cardiopulmonary functions.

Conventionally, such information about interlobar fissures and borders of lung segments was displayed, for example, by directly inputting the information by a manual operation, or by obtaining interlobar fissures by manual input of each lung lobe region.

Meanwhile, as image recognition techniques progressed in recent years, segmentation became performed on various kinds of organs present in a three-dimensional medical image obtained by CT (Computed Tomography), MRI (magnetic resonance imaging) or the like.

For example, Japanese Unexamined Patent Publication No. 2008-142481 (Patent Document 1) discloses a method for automatically extracting interlobar fissures from a CT image, and segmenting lungs into lung lobe units by using the extracted interlobar fissures as boundary surfaces. Patent Document 1 also discloses a method for extracting plural subsegmental veins running between lung segments from a CT image of lungs, and segmenting lung lobes into lung segment units by using surfaces defined by the extracted plural subsegmental veins as boundary surfaces.

SUMMARY OF THE INVENTION

However, in the methods disclosed in Patent Document 1, processing for extracting interlobar fissures or the like is performed on a three-dimensional medical image of the entire lung field. Therefore, there are problems that the time period of extraction processing is long, and that the risk of error detection becomes higher.

In view of the foregoing circumstances, it is an object of the present invention to provide a region extraction apparatus, method and program that can perform high-speed and highly-accurate extraction processing by limiting a region on which processing for extracting interlobar fissures, borders of lung segments, and the like is performed.

A region extraction apparatus of the present invention is a region extraction apparatus comprising:

a three-dimensional medical image obtainment unit that obtains a three-dimensional medical image of a chest;

a bronchial structure extraction unit that extracts a bronchial structure representing a structure of a bronchus or bronchi from the three-dimensional medical image obtained by the three-dimensional medical image obtainment unit;

a divided lung region obtainment unit that divides, based on the divergence of the bronchial structure extracted by the bronchial structure extraction unit, the bronchial structure into a plurality of divided bronchial structures, and obtains a plurality of divided lung regions based on the plurality of divided bronchial structures;

a distance image generation unit that generates, based on the plurality of divided lung regions, a distance image based on a distance between each voxel in an entire region excluding at least one of the plurality of divided lung regions and each of the plurality of divided lung regions; and a border non-existing region extraction unit that extracts, based on the distance image generated by the distance image generation unit, a border non-existing region, which does not include any borders of the plurality of divided lung regions.

Here, the "bronchial structure representing a structure of a bronchus or bronchi" may be a bronchial region representing the bronchus or bronchi themselves, or a graph structure or the like in which regions of the bronchus or bronchi are thinned.

In the region extraction apparatus of the present invention, the distance image generation unit may generate a first distance image based on distances between all of the plurality of divided lung regions and each voxel in the entire region excluding all of the plurality of divided lung regions, and second distance images each based on distances between all except any one of the plurality of divided lung regions and each voxel in the entire region excluding all except the any one of the plurality of divided lung regions. Further, the border non-existing region extraction unit may extract the border non-existing region based on the first distance image and the second distance images.

The distance image generation unit may leave any one of the plurality of divided lung regions, and generate the same number of third distance images as the number of the plurality of divided lung regions, and each of the third distance images being based on a distance between the any one of the plurality of divided lung regions and each voxel in the entire region excluding the any one of the plurality of divided lung regions, and generate the second distance images based on the generated third distance images.

The distance image generation unit may assign labels that are different from each other to all of the plurality of divided lung regions, and calculate a distance between any one of the plurality of divided lung regions, to which the labels have been assigned, and each voxel in the entire region excluding the any one of the plurality of divided lung regions with respect to each of all of the plurality of divided lung regions. Further, the distance image generation unit may generate third distance images by assigning the distance between any one of the plurality of divided lung regions and each voxel to the each voxel, and generate the second distance images based on the generated third distance images.

A border existing region extraction unit that extracts, as a border existing region, an entire region excluding a region composed of the border non-existing region and all of the divided lung regions may be provided.

A border extraction processing unit that extracts a border by performing border extraction processing on the border existing region may be provided.

A display control unit that displays the border extracted by the border extraction processing unit may be provided.

The divided lung region obtainment unit may obtain lung lobe regions, as the divided lung regions.

The divided lung region obtainment unit may obtain lung segments, as the divided lung regions.

A region extraction method of the present invention is a region extraction method comprising the steps of:

obtaining a three-dimensional medical image of a chest;

extracting a bronchial structure representing a structure of a bronchus or bronchi from the obtained three-dimensional medical image;

dividing, based on the divergence of the extracted bronchial structure, the bronchial structure into a plurality of divided bronchial structures, and obtaining a plurality of divided lung regions based on the plurality of divided bronchial structures;

generating, based on the plurality of divided lung regions, a distance image based on a distance between each voxel in an entire region excluding at least one of the plurality of divided lung regions and each of the plurality of divided lung regions; and extracting, based on the generated distance image, a border non-existing region, which does not include any borders of the plurality of divided lung regions.

A region extraction program of the present invention is a region extraction program for causing a computer function as:

a three-dimensional medical image obtainment unit that obtains a three-dimensional medical image of a chest;

a bronchial structure extraction unit that extracts a bronchial structure representing a structure of a bronchus or bronchi from the three-dimensional medical image obtained by the three-dimensional medical image obtainment unit;

a divided lung region obtainment unit that divides, based on the divergence of the bronchial structure extracted by the bronchial structure extraction unit, the bronchial structure into a plurality of divided bronchial structures, and obtains a plurality of divided lung regions based on the plurality of divided bronchial structures;

a distance image generation unit that generates, based on the plurality of divided lung regions, a distance image based on a distance between each voxel in an entire region excluding at least one of the plurality of divided lung regions and each of the plurality of divided lung regions; and a border non-existing region extraction unit that extracts, based on the distance image generated by the distance image generation unit, a border non-existing region, which does not include any borders of the plurality of divided lung regions.

According to the region extraction apparatus, method and program of the present invention, a bronchial structure representing a structure of a bronchus or bronchi is extracted from a three-dimensional medical image of a chest. The extracted bronchial structure is divided, based on the divergence of the bronchial structure, into a plurality of divided bronchial structures. A plurality of divided lung regions are obtained based on the plurality of divided bronchial structures. A distance image based on a distance between each voxel in an entire region excluding at least one of the plurality of divided lung regions and each of the plurality of divided lung regions is generated based on the plurality of divided lung regions. A border non-existing region, which does not include any borders of the plurality of divided lung regions, is extracted based on the generated distance image. Therefore, it is possible to exclude the aforementioned border non-existing region and divided lung regions from the target region of processing for extracting interlobar fissures, borders of lung segments, and the like. Hence, it is possible to limit the range on which extraction processing is performed. Consequently, high-speed and highly-accurate extraction processing becomes possible.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Figure 1:
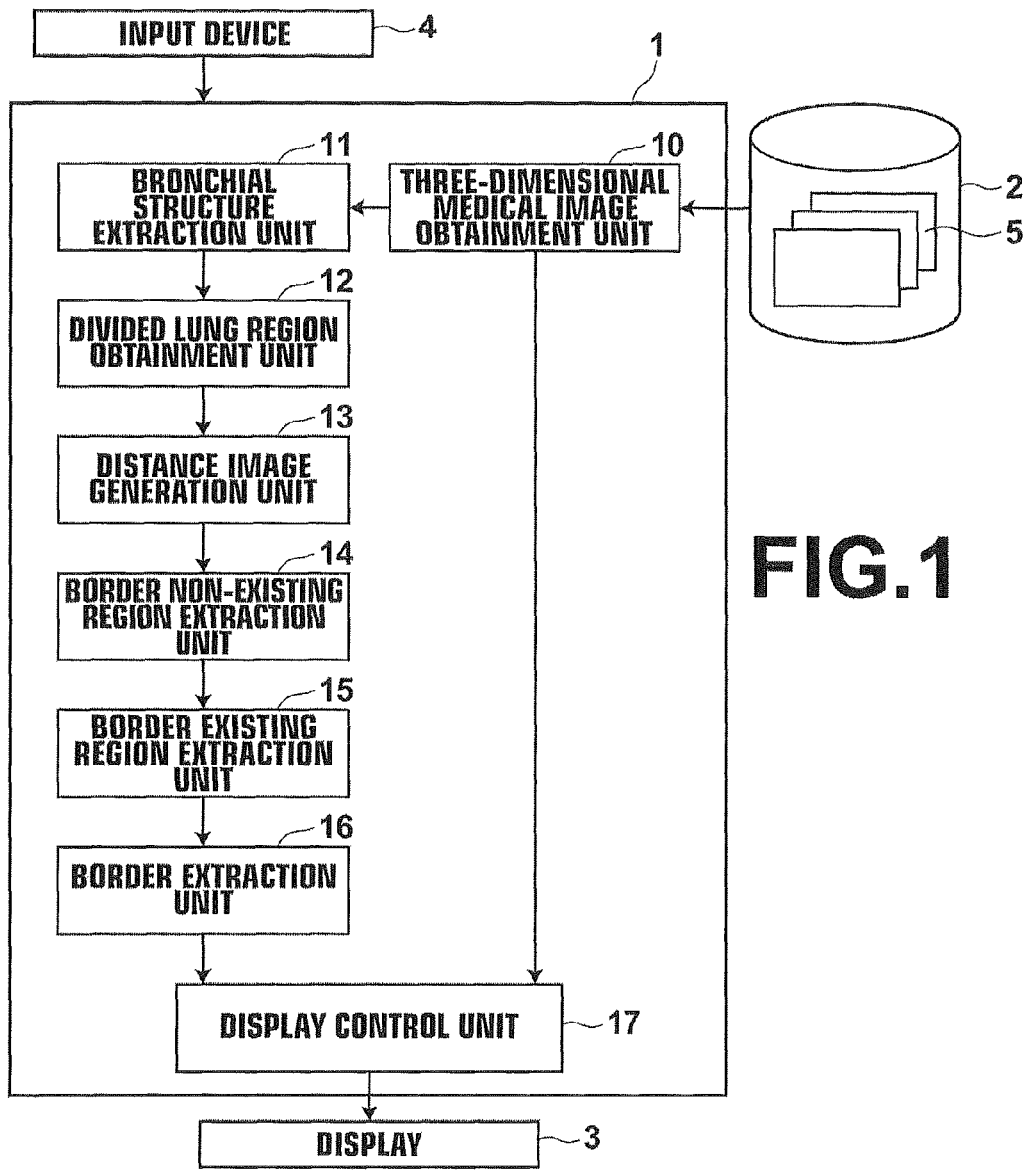
FIG. 1 is a schematic block diagram illustrating the configuration of a medical image diagnosis support system using an embodiment of a region extraction apparatus of the present invention.
Figure 2:
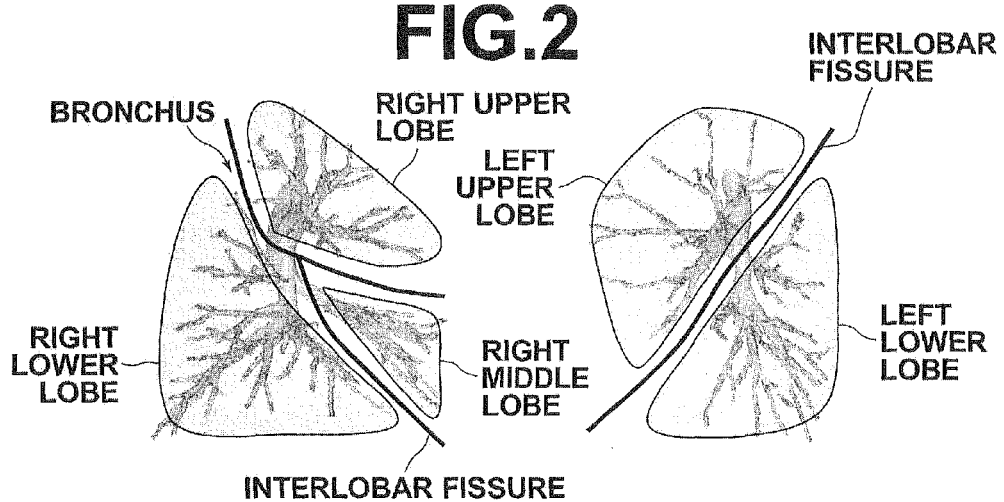
FIG. 2 is a schematic diagram illustrating lung lobe regions and interlobar fissures in the right lung and the left lung.

Hereinafter, a medical image diagnosis support system using a first embodiment of a region extraction apparatus, method and program of the present invention will be described in detail with reference to drawings. FIG. 1 is a schematic block diagram illustrating the configuration of a medical image diagnosis support system according to an embodiment of the present invention. The medical image diagnosis support system according to the embodiment of the present invention extracts a lung region from a three-dimensional medical image of the chest of a subject (patient) to be examined. The medical image diagnosis support system extracts interlobar fissures, as illustrated in FIG. 2, from the lung region at high accuracy and at high speed, and displays the extracted interlobar fissures.

The medical image diagnosis support system according to an embodiment of the present invention includes a medical image display apparatus 1, a three-dimensional medical image storage server 2, a display 3, and an input device 4, as illustrated in FIG. 1.

The medical image display apparatus 1 is configured by installing a region extraction program according to an embodiment of the present invention in a computer. The medical image display apparatus 1 includes a central processing unit (CPU), a semiconductor memory, and a storage device, such as a hard disk and an SSD (Solid State Drive), in which the aforementioned region extraction program has been installed. These hardware components constitute a three-dimensional medical image obtainment unit 10, a bronchial structure extraction unit 11, a divided lung region obtainment unit 12, a distance image generation unit 13, a border non-existing region extraction unit 14, a border existing region extraction unit 15, a border extraction unit 16 and a display control unit 17, as illustrated in FIG. 1. Each of the units operates when the CPU executes the region extraction program installed in the hard disk.

The three-dimensional medical image obtainment unit 10 obtains a three-dimensional medical image 5 of the chest that has been obtained in advance before a surgery or an examination. The three-dimensional medical image 5 is, for example, volume data reconstructed from slice data output from a CT apparatus, an MRI (Magnetic Resonance Imaging) apparatus, or the like, volume data output from an MS (Multi Slice) CT apparatus or a cone beam CT apparatus, or the like. The three-dimensional medical image 5 is stored in advance in the three-dimensional medical image storage server 2 together with identification information about a patient to be examined. The three-dimensional medical image obtainment unit 10 reads out the three-dimensional medical image 5 corresponding to identification information about the patient to be examined, which has been been input at the input device 4, from the three-dimensional medical image storage server 2.

The bronchial structure extraction unit 11 extracts a bronchial structure from the three-dimensional medical image 5 of the chest, which has been obtained by the three-dimensional medical image obtainment unit 10. Specifically, the bronchial structure extraction unit 11 extracts, as the bronchial structure, a graph structure of a bronchial region included in the input three-dimensional medical image 5. Next, an example of a method for extracting the graph structure will be described.

The bronchus or bronchi included in the three-dimensional medical image 5 appear as a low voxel value region, because voxels representing the inside of the bronchus or bronchi correspond to an air region. However, the bronchial wall is considered to be a cylindrical or linear structure representing relatively high voxel values. Therefore, the bronchus or bronchi are extracted by performing structure analysis of the shape based on the distribution of voxel values on each voxel.

A bronchus diverges many times, and the diameter of the bronchus becomes narrower as approaching the terminal end of the bronchus. Therefore, Gaussian pyramid images are generated in advance by performing multi-resolution transformation on the three-dimensional medical image so that bronchi (tubular structures) in various sizes are detectable. In other words, plural three-dimensional medical images having different resolutions from each other are generated. Then, each of the generated Gaussian pyramid images is scanned by a detection algorithm. Accordingly, tubular structures in different sizes are detected.

First, a Hessian matrix of each voxel in the three-dimensional medical image at each resolution is calculated, and judgment is made as to whether the voxel is located in the tubular structure based on size relationships among eigenvalues of the Hessian matrix. The Hessian matrix is composed of second-order partial derivatives of density values in the direction of each axis (x-axis, y-axis and z-axis of a three-dimensional image), and is a 3×3 matrix, as follows:

$$\nabla^2 I = \begin{bmatrix} I_{xx} & I_{xy} & I_{xz} \\ I_{xx} & I_{xy} & I_{xz} \\ I_{xx} & I_{xy} & I_{xz} \end{bmatrix}$$ [Equation]

$$I_{xx} = \frac{\delta^2 I}{\delta x^2}, I_{xy} = \frac{\delta^2 I}{\delta x \delta y^2}, ..$$

It is known that when eigenvalues of the Hessian matrix at an arbitrary voxel are λ1, λ2, and λ3, if two of the eigenvalues are large, and the other one of the eigenvalue is close to 0, for example, if λ3, λ2>>λ1 and λ1≈0 are satisfied, the voxel represents a tubular structure. Further, an eigenvector corresponding to the smallest eigenvalue (λ1≈0) of the Hessian matrix coincides with the direction of the principal axis of the tubular structure.

The bronchus or bronchi may be represented as a graph structure. However, a tubular structure extracted as described above is not always detected as a graph structure connecting the entire tubular structure together because of an influence of a tumor or the like. Therefore, after the entire three-dimensional image is judged, evaluation is made as to whether the detected tubular structure is within a predetermined distance, and whether an angle of the direction of a basic line connecting arbitrary points on extracted two tubular structures to the direction of the principal axis of each of the tubular structures is within a predetermined angle. Accordingly, judgment is made as to whether plural tubular structures are connected to each other, and the connection relationship between the extracted tubular structures is reconstructed. Extraction of the graph structure of the bronchus or bronchi is completed by this reconstruction processing (please refer to U.S. Patent Application Publication No. 20110135172, and the like for details).

The extracted graph structure is classified into a start point, an end point, a divergence point and an edge (connection), and the start point, the end point and the divergence point are connected by edges. Accordingly, it is possible to obtain a graph structure representing the bronchi or bronchus. The method for generating a graph structure is not limited the above method, and other methods may be adopted.

Further, the phrase "divergence of the bronchial structure" refers to a position on the tubular structure that is classified, as a divergence point in the graph structure. The divergence of the bronchial structure is located on a boundary surface of each region when the lung or lungs are divided into plural regions.

The divided lung region obtainment unit 12 divides, based on the divergence of the graph structure of the bronchial region extracted by the bronchial structure extraction unit 11, the graph structure into plural divided graph structures, and obtains plural divided lung regions based on the plural divided graph structures. Specifically, first, the divided lung region obtainment unit 12 performs, based on the divergence of the graph structure of the bronchial region, anatomical labeling on the graph structure. This labeling is performed based on regions dominated by bronchi, and the regions dominated by bronchi, which are divided by labeling, correspond to lung lobe regions (a right upper lobe region, a right middle lobe region, a right lower lobe region, a left upper lobe region, and a left lower lobe region) in the lungs, respectively. This means that the divergence of the bronchial structure is located on the boundary surface of each divided region.

Since techniques for labeling bronchi are already known, detailed descriptions will be omitted. For example, the following techniques or the like may be used: P. Lo et al., "A Bottom-up approach for labeling of human airway trees", Fourth INTERNATIONAL WORKSHOP ON PULMONARY IMAGE ANALYSIS, pp. 23-34, 2011 and J. Lee et al., "Bronchial Segment Matching in Low-dose Lung CT Scan Pairs", Medical Imaging 2009: Computer-Aided Diagnosis, Proceeding of SPIE, Vol. 7260, pp. 72600A1-72600A8.

In the embodiment of the present invention, the bronchial structure extraction unit 11 extracts the graph structure of the bronchial region, and labeling is performed based on the divergence of the graph structure. However, it is not necessary that processing is performed in such a manner. For example, the bronchial structure extraction unit 11 may extract the bronchial region of the bronchi themselves, and labeling may be performed based on the divergence of the bronchial region.

Further, the divided lung region obtainment unit 12 obtains, based on the result of labeling the bronchi, lung lobe regions (the right upper lobe region, the right middle lobe region, the right lower lobe region, the left upper lobe region, and the left lower lobe region), as divided lung regions. Each of the lung lobe regions is obtainable, for example, by obtaining a convex region by applying Quickhull algorithm to the graph structure of the bronchi (divided bronchial structure) to which the same label has been assigned.

The distance image generation unit 13 generates, based on the plural lung lobe regions obtained by the divided lung region obtainment unit 12, a distance image based on a distance between each voxel in an entire region of the lung excluding the lung lobe regions and each of the lung lobe regions. The method for generating the distance image will be described later.

The border non-existing region extraction unit 14 extracts, based on the distance image generated by the distance image generation unit 13, a border non-existing region, which does not include any borders of the lung lobe regions. In the embodiment of the present invention, the term "border non-existing region" refers to a region in which the aforementioned interlobar fissures are clearly not present. The method for extracting the border non-existing region will be described later in detail.

The border existing region extraction unit 15 extracts, as a border existing region, an entire region excluding a region composed of the border non-existing region, which has been extracted by the border non-existing region extraction unit 14, and each of the lung lobe regions obtained by the divided lung region obtainment unit 12.

The border extraction unit extracts an interlobar fissure by performing border extraction processing on the border existing region, which has been extracted by the border existing region extraction unit 15. As a method for extracting the interlobar fissure, an already known technique may be adopted. For example, a method disclosed in Japanese Unexamined Patent Publication No. 2008-142481 may be used.

The display control unit 17 displays, on the display 3, the three-dimensional medical image 5 of the chest obtained by the three-dimensional medical image obtainment unit 10, each lung lobe region obtained by the divided lung region obtainment unit 12, the border non-existing region extracted by the border non-existing region extraction unit 14, the border existing region extracted by the border existing region extraction unit 15, an interlobar fissure extracted by the border extraction unit 16, and the like.

Figure 3:
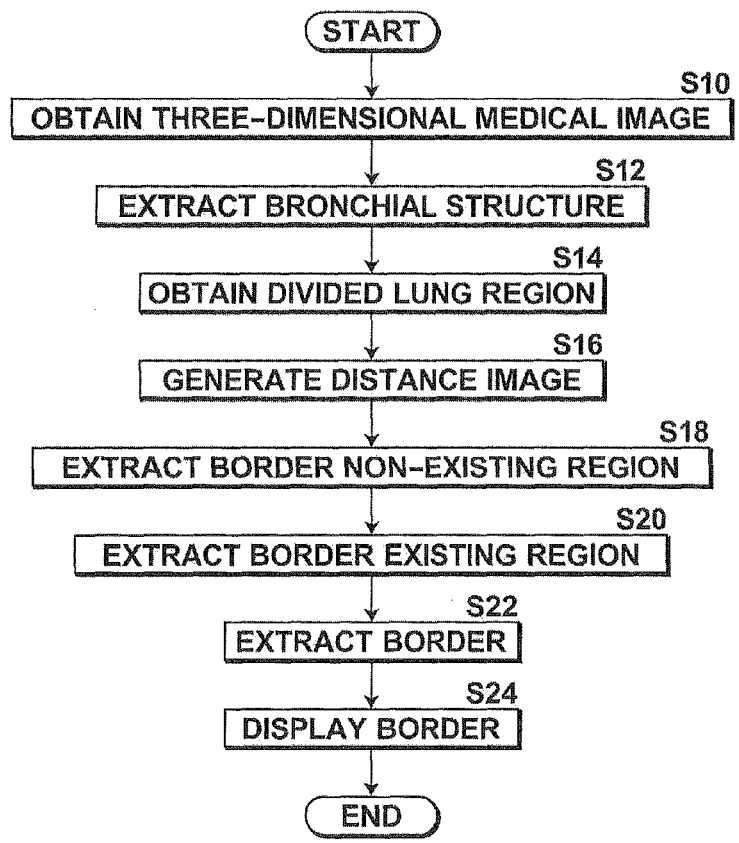
FIG. 3 is a flow chart for explaining the action of a medical image diagnosis support system using an embodiment of a region extraction apparatus according to the present invention.

Next, the action of the medical image diagnosis support system in an embodiment of the present invention will be described with reference to the flow chart illustrated in FIG. 3.

First, a user inputs identification information about a patient to be examined by using the input device 4. The three-dimensional medical image obtainment unit 10 obtains the three-dimensional medical image 5 of the chest corresponding to the input identification information by reading data from the three-dimensional medical image storage server 2 (S10).

The three-dimensional medical image 5 of the chest obtained by the three-dimensional medical image obtainment unit 10 is output to the bronchial structure extraction unit 11. The bronchial structure extraction unit 11 generates a graph structure of a bronchial structure included in the input three-dimensional medical image 5 (S12).

Figure 4:
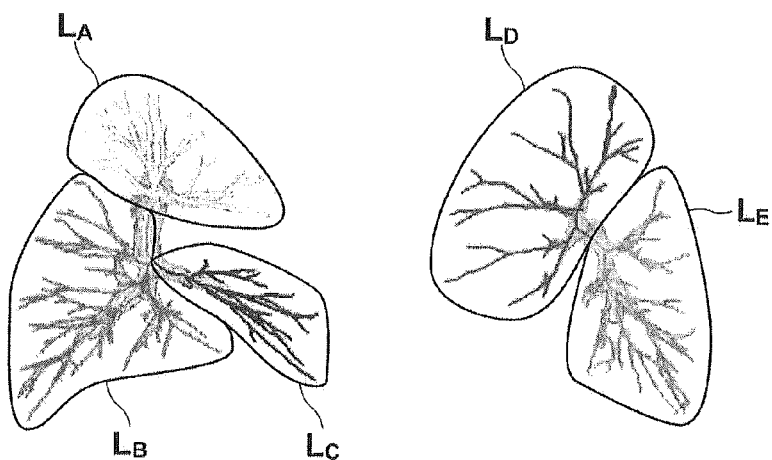
FIG. 4 is a diagram for explaining labeling a graph structure of bronchi.

The graph structure generated by the bronchial structure extraction unit 11 is output to the divided lung region obtainment unit 12. The divided lung region obtainment unit 12 performs, based on the divergence of the input graph structure of the bronchial region, anatomical labeling on the graph structure. FIG. 4 illustrates an example of the result of labeling the graph structure of the bronchial region. With respect to the graph structure of the bronchial structure in the right lung, different labels are assigned to graph structures in region $L_A$, region $L_B$, and region $L_C$, respectively. Further, with respect to the graph structure of the bronchial structure in the left lung, different labels are assigned to graph structures in region $L_D$ and region $L_E$, respectively.

Figure 5:
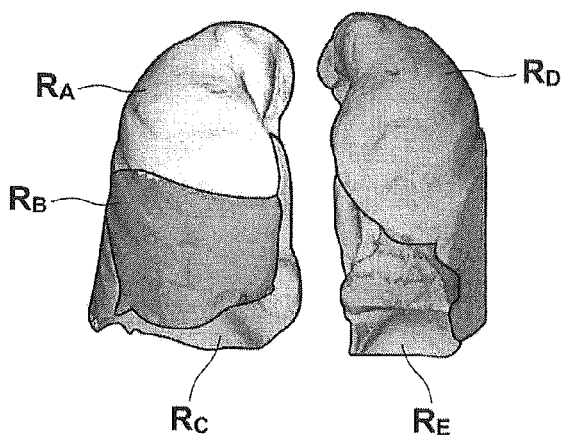
FIG. 5 is a schematic diagram illustrating lung lobe regions obtained based on the result of labeling the bronchial structure.

Then, the divided lung region obtainment unit 12 obtains, based on the result of labeling the bronchi as illustrated in FIG. 4, lung lobe regions (the right upper lobe region, the right middle lobe region, the right lower lobe region, the left upper lobe region, and the left lower lobe region), as divided lung regions (S14). FIG. 5 is a diagram illustrating an example of right upper lobe region $R_A$, right middle lobe region $R_B$, right lower lobe region $R_C$, left upper lobe region $R_D$, and left lower lobe region $R_E$ obtained by the divided lung region obtainment unit 12.

Then, the distance image generating unit 13 generates, based the right upper lobe region $R_A$, the right middle lobe region $R_B$, the right lower lobe region $R_C$, a distance image based on a distance between each voxel in an entire region excluding these lung lobe regions and each of the lung lobe regions for the right lung. Further, the distance image generating unit 13 generates, based the left upper lobe region $R_D$ and the left lower lobe region $R_E$, a distance image based on a distance between each voxel in an entire region excluding these lung lobe regions and each of the lung lobe regions for the left lung. Next, a method for generating a distance image will be described in detail.

Figure 6:
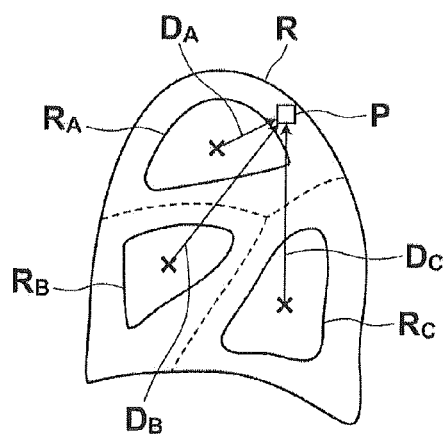
FIG. 6 is a diagram for explaining a method for generating a first distance image.

FIG. 6 is a schematic diagram illustrating right upper lobe region $R_A$, right middle lobe region $R_B$, right lower lobe region $R_C$ and entire region R of the right lung. Here, the three-dimensional medical image of the entire region R of the right lung is separately extracted from the three-dimensional medical image 5 of the chest obtained by the three-dimensional medical image obtainment unit 10, and input to the distance image generation unit 13. Therefore, as illustrated in FIG. 6, the range of the three-dimensional medical image of the entire region R of the right lung and the range of the three-dimensional medical image of the right upper lobe region $R_A$, the right middle lobe region $R_B$, and the right lower lobe region $R_C$ are different from each other.

In the entire region R of the right lung, the entire region excluding the right upper lobe region $R_A$, the right middle lobe region $R_B$ and the right lower lobe region $R_C$ is a region in which an interlobar fissure is present, or a region in which an interlobar fissure is clearly not present. The distance image is generated to obtain the region in which an interlobar fissure is clearly not present.

Specifically, first, as illustrated in FIG. 6, distance $D_A$ between each voxel P in an entire region excluding the right upper lobe region $R_A$, the right middle lobe region $R_B$ and the right lower lobe region $R_C$ and the right upper lobe region $R_A$ is calculated. Further, distance $D_B$ between the each voxel P and the right middle lobe region $R_B$, and distance $D_C$ between each voxel P and the right lower lobe region $R_C$ are calculated. Further, the shortest one of the distance $D_A$, the distance $D_B$, and the distance $D_C$ is obtained as the value of the distance of each voxel P, and a first distance image is generated by assigning the value of the distance to each voxel P. In the embodiment of the present invention, a distance between the coordinate value of each voxel P and the coordinate value of the center of gravity of each lung lobe region is used, as a distance between each voxel P and the lung lobe region. However, it is not always necessary that such a distance is used. A distance between the coordinate value of each voxel P and the coordinate value of an arbitrary point in each lung lobe region should be used. The coordinate value of an arbitrary point in each lung lobe region may be set and input in advance by a user using the input device 4. Further, the user may change the coordinate value of the arbitrary point in each lung lobe region by using the input device 4.

Figure 7:
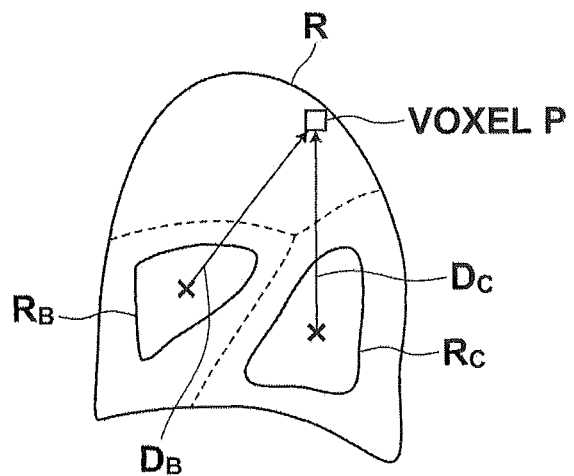
FIG. 7 is a diagram for explaining a method for generating a second distance image.

Then, as illustrated in FIG. 7, the right upper lobe region $R_A$ is eliminated from the entire region R of the right lung to obtain a region, and distance $D_B$ between each voxel P in the obtained region excluding the right middle lobe region $R_B$ and the right lower lobe region $R_C$ and the right middle lobe region $R_B$ is calculated. Further, distance $D_C$ between the each voxel P and the right lower lobe region $R_C$ is calculated. The shorter one of the distance $D_B$ and the distance $D_C$ is obtained as the value of a distance of each voxel P. Distance image A is generated, as one of second distance images, by assigning the value of the distance to each voxel P.

Figure 8:
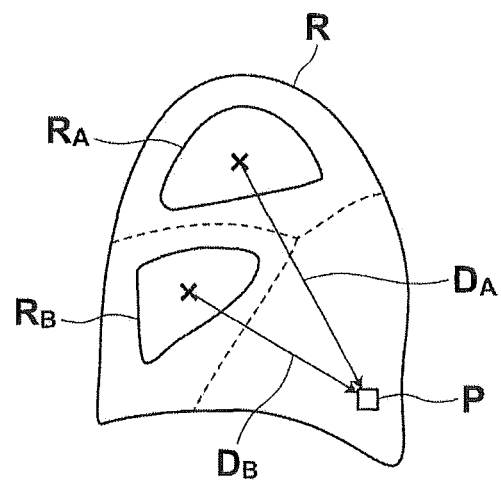
FIG. 8 is a diagram for explaining a method for generating a second distance image.

Then, as illustrated in FIG. 8, the right lower lobe region $R_C$ is eliminated from the entire region R of the right lung to obtain a region, and distance $D_A$ between each voxel P in the obtained region excluding the right upper lobe region $R_A$ and the right middle lobe region $R_B$ and the right upper lobe region $R_A$ is calculated. Further, distance $D_B$ between the each voxel P and the right middle lobe region $R_B$ is calculated. The shorter one of the distance $D_A$ and the distance $D_B$ is obtained as the value of a distance of each voxel P. Distance image C is generated, as one of second distance images, by assigning the value of the distance to each voxel P.

Figure 9:
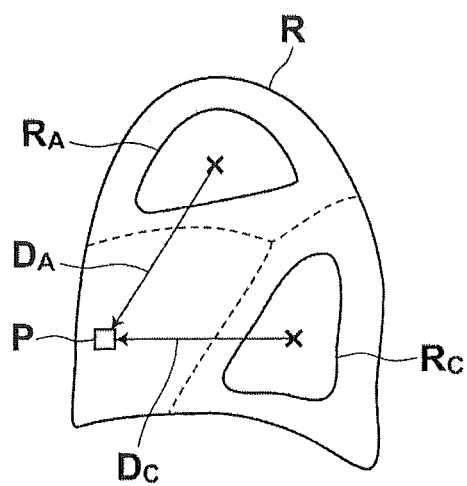
FIG. 9 is a diagram for explaining a method for generating a second distance image.

Then, as illustrated in FIG. 9, the right middle lobe region $R_B$ is eliminated from the entire region R of the right lung to obtain a region, and distance $D_A$ between each voxel P in the obtained region excluding the right upper lobe region $R_A$ and the right lower lobe region $R_C$ and the right upper lobe region $R_A$ is calculated. Further, distance $D_C$ between the each voxel P and the right lower lobe region $Et_C$ is calculated. The shorter one of the distance $D_A$ and the distance $D_C$ is obtained as the value of a distance of each voxel P. Distance image B is generated, as one of second distance images, by assigning the value of the distance to each voxel P.

As described above, the first distance image is generated based on distances between all of the lung lobe regions and voxel P. Further, three distance images A, B and C are generated as second distance images. The second distance images are generated each based on distances between all except any one of lung lobe regions and voxel P. Further, the first distance image generated by the distance image generation unit 13, and distance images A, B and C, as the second distance images, are output to the border non-existing region extraction unit 14.

The border non-existing region extraction unit 14 extracts, based on the input first distance image and distance images A, B and C, a border non-existing region in which an interlobar fissure is clearly not present (S18).

Figure 10:
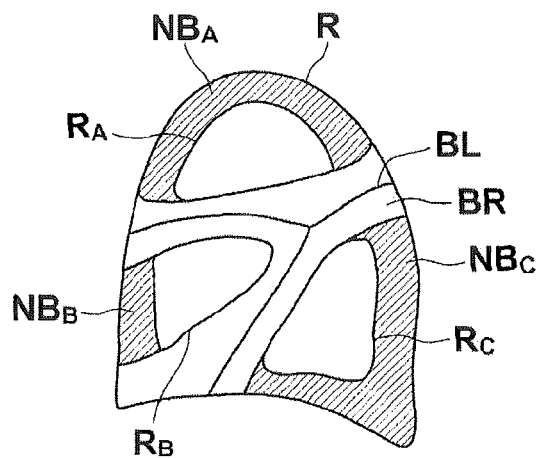
FIG. 10 is a diagram illustrating an example of a border non-existing region, a border existing region and interlobar fissures.

Specifically, first, a difference between the first distance image and distance image A is calculated, and voxels at which the difference is greater than or equal to a predetermined threshold are obtained. The group of obtained voxels is extracted, as border non-existing region $NB_A$, as illustrated in FIG. 10.

Then, a difference between the first distance image and distance image B is calculated, and voxels at which the difference is greater than or equal to a predetermined threshold are obtained. The group of obtained voxels is extracted, as border non-existing region $NB_B$, as illustrated in FIG. 10.

Further, a difference between the first distance image and distance image C is calculated, and voxels at which the difference is greater than or equal to a predetermined threshold are obtained. The group of obtained voxels is extracted, as border non-existing region $NB_A$, as illustrated in FIG. 10.

The border non-existing region extraction unit 14 extracts border non-existing region $NB_A$, border non-existing region $NB_B$, and border non-existing region $NB_C$, as described above, and outputs them to the border existing region extraction unit 15.

The border existing region extraction unit 15 extracts, as border existing region BR, an entire region excluding a region composed of the input border non-existing regions $NB_A$, $NB_B$ and $NB_C$, the right upper lobe region $R_A$, the right middle lobe region $R_B$, and the right lower lobe region $R_C$ (S20). The border existing region BR extracted by the border existing region extraction unit 15 is output to the border extraction unit 16.

The border extraction unit 16 performs border extraction processing on the border existing region BR, which has been input, and extracts interlobar fissures BL, as illustrated in FIG. 10. The border extraction unit 16 outputs the information about the interlobar fissures to the display control unit 17.

Then, the display control unit 17 displays, based on the input information about the interlobar fissures, the interlobar fissures on the display 3 (S24). At this time, the interlobar fissures are displayed in such a manner to be superimposed on the three-dimensional medical image of entire image R of the right lung. Further, each of lung lobe regions $R_A$, $R_B$ and $R_C$ may be superimposed also on the three-dimensional medical image of the entire image R of the right lung.

In the above descriptions, a method for extracting interlobar fissures of the right lung was described. Interlobar fissures of the left lung may be extracted through similar processing.

Specifically, first, distance $D_D$ between each voxel P in an entire region excluding the left upper lobe region $R_D$ and the left lower lobe region $R_E$ and the left upper lobe region $R_D$ is calculated. Further, distance $D_E$ between the each voxel P and the left lower lobe region $R_E$ is calculated. Further, the shorter one of the distance $D_D$ and the distance $D_E$ is obtained as the value of the distance of each voxel P, and a first distance image is generated by assigning the value of the distance to each voxel P.

Then, the left upper lobe region $R_D$ is eliminated from entire region L of the left lung to obtain a region, and distance $D_E$ between each voxel P in the obtained region excluding the left lower lobe region $R_E$ and the left lower lobe region $R_E$ is calculated. Distance image E is generated, as one of second distance images, by assigning the value of the distance $D_E$ to each voxel P.

Then, the left lower lobe region $R_E$ is eliminated from entire region L of the left lung to obtain a region, and distance $D_D$ between each voxel P in the obtained region excluding the left upper lobe region $R_D$ and the left upper lobe region $R_D$ is calculated. Distance image D is generated, as one of second distance images, by assigning the value of the distance $D_D$ to each voxel P.

As described above, the first distance image is generated based on distances between all of the lung lobe regions and voxel P. Further, two distance images D and E are generated as second distance images. The second distance image is generated based on distances between all except one of lung lobe regions and voxel P.

Further, the border non-existing region extraction unit 14 calculates a difference between the first distance image and distance image C, and obtains voxels at which the difference is greater than or equal to a predetermined threshold. The group of obtained voxels is extracted, as border non-existing region $NB_C$.

Then, a difference between the first distance image and distance image D is calculated, and voxels at which the difference is greater than or equal to a predetermined threshold are obtained. The group of obtained voxels is extracted, as border non-existing region $NB_D$.

Then, the border existing region extraction unit 15 extracts, as border existing region BR, an entire region excluding a region composed of the border non-existing regions $NB_C$ and $NB_D$, the left upper lobe region $R_D$ and the left lower lobe region $R_E$.

Further, the border extraction unit 16 performs border extraction processing on the border existing region BR, and extracts interlobar fissures BL from the left lung. The display control unit 17 displays the interlobar fissures BL on the display 3.

According to the medical image diagnosis support system in the embodiment of the present invention, a bronchial structure is extracted from a three-dimensional medical image of a chest. The extracted bronchial structure is divided, based on the divergence of the bronchial structure, into plural divided bronchial structures. Plural lung lobe regions are obtained based on the plural divided bronchial structures. A distance image based on a distance between each voxel in an entire region excluding the plural lung lobe regions and each of the plural lung lobe regions is generated based on the plural lung lobe regions. A border non-existing region, which does not include any interlobar fissure, is extracted based on the generated distance image. Therefore, it is possible to exclude the aforementioned border non-existing region and lung lobe regions from the target region of processing for extracting interlobar fissures. Hence, it is possible to limit the range on which extraction processing is performed. Consequently, high-speed and highly-accurate extraction processing becomes possible.

Next, a medical image diagnosis support system using a second embodiment of the present invention will be described. In the medical image diagnosis support system according to the second embodiment, a method for generating second distance images A, B and C is different from the medical image diagnosis support system according to the first embodiment, but the other actions are the same. Therefore, the method for generating second distance images A, B and C in the second embodiment will be mainly described.

The distance image generation unit 13 in the second embodiment is similar to the first embodiment in that the first distance image is generated. However, the method for generating the second distance images A, B and C is different, as described above.

Figure 11:
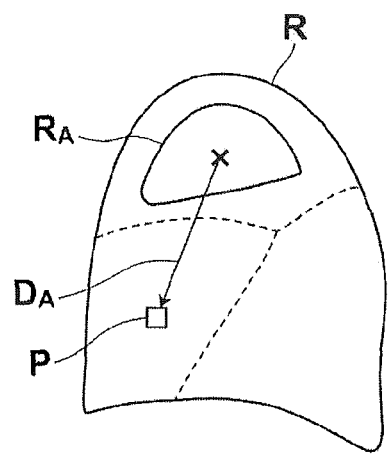
FIG. 11 is a diagram for explaining another method for generating a second distance image.

Specifically, as illustrated in FIG. 11, first, the distance image generation unit 13 according to the second embodiment leaves only right upper lobe region $R_A$ of the three lung lobe regions in entire region R of the right lung. Further, the distance image generation unit 13 calculates distance $D_A$ between each voxel P in the entire region R excluding the right upper lobe region $R_A$ and the right upper lobe region $R_A$. Further, the distance image generation unit 13 generates distance image A', as one of third distance images, by assigning the value of the distance $D_A$ to each voxel P.

Figure 12:
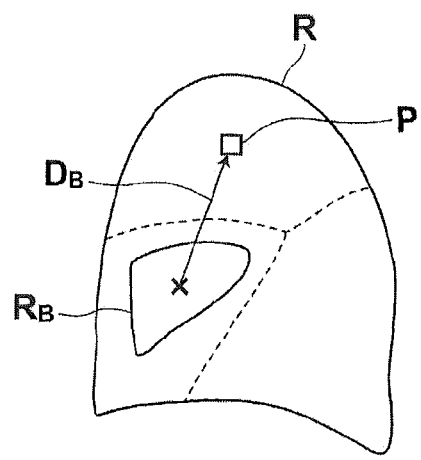
FIG. 12 is a diagram for explaining another method for generating a second distance image.

Then, as illustrated in FIG. 12, the distance image generation unit 13 leaves only right middle lobe region $R_B$ of the three lung lobe regions in entire region R of the right lung. The distance image generation unit 13 calculates distance $D_B$ between each voxel P in the entire region R excluding the right middle lobe region $R_B$ and the right middle lobe region $R_B$. Further, the distance image generation unit 13 generates distance image B', as one of third distance images, by assigning the value of the distance $D_B$ to each voxel P.

Figure 13:
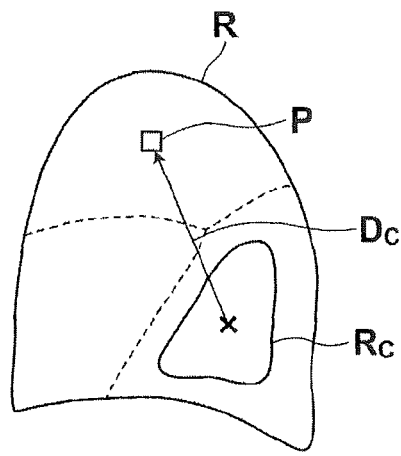
FIG. 13 is a diagram for explaining another method for generating a second distance image.
Figure 14:
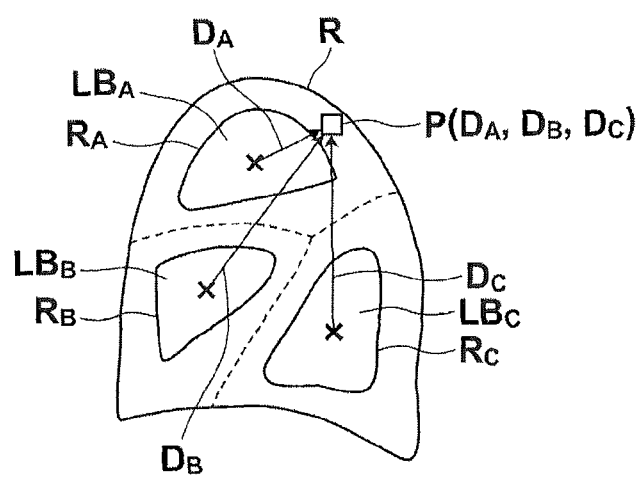
FIG. 14 is a diagram for explaining another method for generating a second distance image.

Further, as illustrated in FIG. 13, the distance image generation unit 13 leaves only right lower lobe region $R_C$ of the three lung lobe regions in entire region R of the right lung. The distance image generation unit 13 calculates distance $D_C$ between each voxel P in the entire region R excluding the right lower lobe region $R_C$ and the right lower lobe region $R_C$. Further, the distance image generation unit 13 generates distance image C', as one of third distance images, by assigning the value of distance $D_C$ to each voxel P.

Then, the values of distances of corresponding voxels are compared with each other between the distance image A' obtained in FIG. 11 and the distance image B' obtained in FIG. 12. Further, distance image C, as the second distance image in the first embodiment, is generated by assigning the shorter one of the two distances to the value of the distance of the voxel P.

Further, the values of distances of corresponding voxels are compared with each other between the distance image B' obtained in FIG. 12 and the distance image C' obtained in FIG. 13. Further, distance image A, as the second distance image in the first embodiment, is generated by assigning the shorter one of the two distances to the value of the distance of the voxel P.

Further, the values of distance of corresponding voxels are compared with each other between the distance image A' obtained in FIG. 11 and the distance image C' obtained in FIG. 13. Further, distance image B, as the second distance image in the first embodiment, is generated by assigning the shorter one of the two distances to the value of the distance of the voxel P.

In the second embodiment, distance images A, B and C, as second distance images, are generated as described above.

In the above descriptions, a method for generating the second distance images for the right lung was described. The method for generating the second distance image for the left lung is similar to the first embodiment.

The other actions are similar to the medical image diagnosis support system according to the first embodiment.

Next, a medical image diagnosis support system using a third embodiment of the present invention will be described. In the medical image diagnosis support system according to the third embodiment, a method for generating second distance images A, B and C is also different from the medical image diagnosis support system according to the first embodiment, but the other actions are the same. Therefore, the method for generating second distance images A, B and C in the third embodiment will be mainly described.

The distance image generation unit 13 in the third embodiment is similar to the first embodiment in that the first distance image is generated. However, the method for generating the second distance images A, B and C is different, as described above.

Specifically, different labels are assigned to right upper lobe region $R_A$, right middle lobe region $R_B$ and right lower lobe region $R_C$ in entire region R of the right lung, respectively. For example, label $LB_A$ is assigned to voxels in the right upper lobe region $R_A$. Label $LB_B$ is assigned to voxels in the right middle lobe region $R_B$. Label $LB_C$ is assigned to voxels in the right lower lobe region $R_C$. Further, with respect to each voxel P in the entire region R excluding the right upper lobe region $R_A$, the right middle lobe region $R_B$ and the right lower lobe region $R_C$, distance $D_A$ from each voxel P to the right upper lobe region $R_A$, distance $D_B$ from each voxel P to the right middle lobe region $R_C$ and distance $D_C$ from each voxel P to the right lower lobe region $R_C$ are calculated, and a distance image in which each voxel P has these distances ($D_A$, $D_E$, $D_C$) is generated as a third distance image.

Further, with respect to each voxel P in the third distance image, first, distance $D_A$ and distance $D_B$ are compared with each other, and the value of the smaller one of the distances is obtained. Distance image C, as one of second distance images, is generated by assigning the obtained value of distance to the voxel P. Then, with respect to each voxel P, distance $D_B$ and distance $D_C$ are compared with each other, and the value of the smaller one of the distances is obtained. Distance image A, as one of second distance images, is generated by assigning the obtained value of distance to the voxel P. Then, with respect to each voxel P, distance $D_A$ and distance $D_C$ are compared with each other, and the value of the smaller one of the distances is obtained. Distance image B, as one of second distance images, is generated by assigning the obtained value of distance to the voxel P.

As described above, it is possible to generate distance images A, B and C similar to those of the first embodiment. According to the third embodiment, unlike the second embodiment, it is not necessary to generate three third distance images. Since it is possible to generate the aforementioned third distance image through one process, the processing time is reduced, compared with the second embodiment.

In the above descriptions, the method for generating second distance images for the right lung was described. It is possible to generate second distance images for the left lung through similar processing.

Specifically, different labels are assigned to left upper lobe region $R_D$ and left lower lobe region $R_E$ in entire region L of the left lung, respectively. For example, label $LB_D$ is assigned to voxels in the left upper lobe region $R_D$. Label $LB_E$ is assigned to voxels in the left lower lobe region $R_E$. Further, with respect to each voxel P in the entire region L excluding the left upper lobe region $R_D$ and the left lower lobe region $R_E$, distance $D_D$ from each voxel P to the left upper lobe region $R_D$ and distance $D_E$ from each voxel P to the left lower lobe region $R_E$ are calculated.

Further, it is possible to generate distance image D, as one of second distance images, by assigning the value of distance $D_D$ to each voxel P. It is possible to generate distance image E, as one of second distance images, by assigning the value of distance $D_E$ to each voxel P.

The other actions are similar to the medical image diagnosis support system in the first embodiment.

Figure 15:
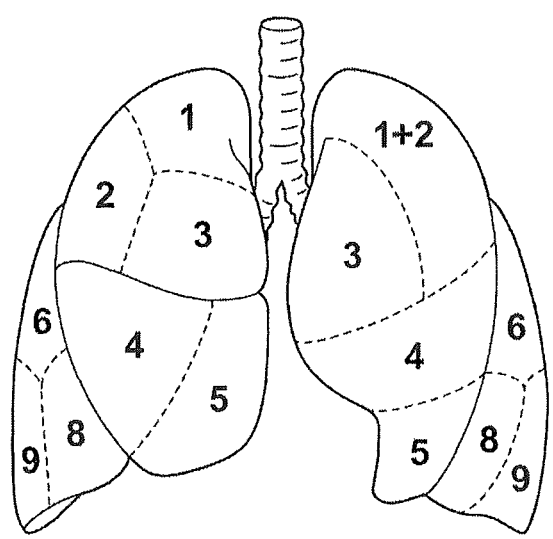
FIG. 15 is a schematic diagram illustrating lung segments in the right lung and the left lung.
Figure 15:
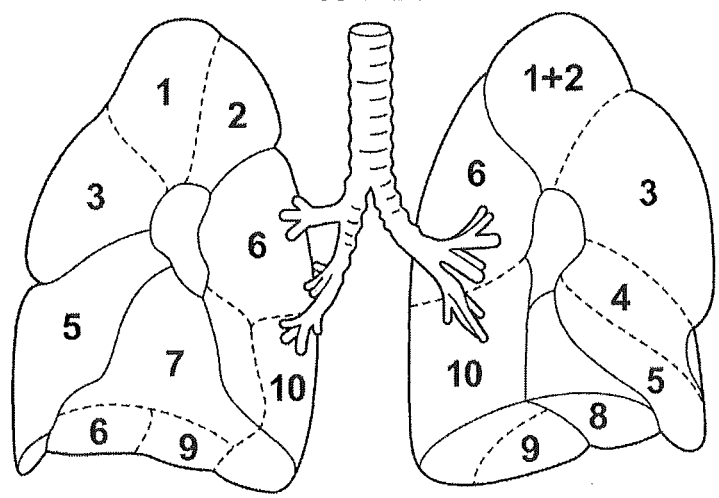

In the first through third embodiments, each lung lobe region (a right upper lobe region, a right middle lobe region, a right lower lobe region, a left upper lobe region, and a left lower lobe region) is obtained from a bronchial structure. First and second distance images are generated based on each lung lobe region. Further, a border non-existing region and a border existing region are obtained based on the first and second distance images, and interlobar fissures are extracted from the border existing region. However, the present invention is not limited to such processing. The present invention may be applied to extraction of borders of lung segments, as illustrated in FIG. 15. FIG. 15 illustrates lung segments when the lungs are viewed from the front side and lung segments when the lungs are viewed from the rear side. As illustrated in FIG. 15, the right lung is divided into 10 lung segments, i.e., regions 1 through 10. The left lung is divided into eight lung segments, i.e., regions 1+2, 3 through 6 and 8 through 10.

Specifically, each lung segment should be obtained, as a divided lung region, based on the result labeling the bronchial structure. Further, first and second distance images should be generated based on each lung segment. A border non-existing region and a border existing region should be obtained based on the first and second distance images, and borders of lung segments should be extracted from the border existing region. The method for generating the first and second distance images is similar to the aforementioned first through third embodiments. Each lung lobe region in the method for generating the first and second distance images in the aforementioned first through third embodiments should be replaced by the lung segment.

What is claimed is:

1. A region extraction apparatus comprising:
  a three-dimensional medical image obtainment unit that obtains a three-dimensional medical image of a chest;
  a bronchial structure extraction unit that extracts a bronchial structure representing a structure of a bronchus or bronchi from the three-dimensional medical image obtained by the three-dimensional medical image obtainment unit;
  a divided lung region obtainment unit that divides, based on the divergence of the bronchial structure extracted by the bronchial structure extraction unit, the bronchial structure into a plurality of divided bronchial structures, and obtains a plurality of divided lung regions based on the plurality of divided bronchial structures;
  a distance image generation unit that generates, based on the plurality of divided lung regions, a distance image based on a distance between each voxel in an entire region excluding at least one of the plurality of divided lung regions and each of the plurality of divided lung regions; and
  a border non-existing region extraction unit that extracts, based on the distance image generated by the distance image generation unit, a border non-existing region, which does not include any borders of the plurality of divided lung regions.

2. The region extraction apparatus, as defined in claim 1, wherein the distance image generation unit generates a first distance image based on distances between all of the plurality of divided lung regions and each voxel in the entire region excluding all of the plurality of divided lung regions, and second distance images each based on distances between all except any one of the plurality of divided lung regions and each voxel in the entire region excluding all except the any one of the plurality of divided lung regions, and wherein the border non-existing region extraction unit extracts the border non-existing region based on the first distance image and the second distance images.

3. The region extraction apparatus, as defined in claim 2, wherein the distance image generation unit leaves any one of the plurality of divided lung regions, and generates the same number of third distance images as the number of the plurality of divided lung regions, and each of the third distance images being based on a distance between the any one of the plurality of divided lung regions and each voxel in the entire region excluding the any one of the plurality of divided lung regions, and generates the second distance images based on the generated third distance images.

4. The region extraction apparatus, as defined in claim 2, wherein the distance image generation unit assigns labels that are different from each other to all of the plurality of divided lung regions, and calculates a distance between anyone of the plurality of divided lung regions, to which the labels have been assigned, and each voxel in the entire region excluding the any one of the plurality of divided lung regions with respect to each of all of the plurality of divided lung regions, and generates third distance images by assigning the distance between any one of the plurality of divided lung regions and each voxel to the each voxel, and generates the second distance images based on the generated third distance images.

5. The region extraction apparatus, as defined in claim 1, the apparatus further comprising:
a border existing region extraction unit that extracts, as a border existing region, the entire region excluding a region composed of the border non-existing region and all of the plurality of divided lung regions.

6. The region extraction apparatus, as defined in claim 5, the apparatus further comprising:
a border extraction processing unit that extracts a border by performing border extraction processing on the border existing region.

7. The region extraction apparatus, as defined in claim 6, the apparatus further comprising:
a display control unit that displays the border extracted by the border extraction processing unit.

8. The region extraction apparatus, as defined in claim 1, wherein the divided lung region obtainment unit obtains lung lobe regions, as the plurality of divided lung regions.

9. The region extraction apparatus, as defined in claim 1, wherein the divided lung region obtainment unit obtains lung segments, as the plurality of divided lung regions.

10. A region extraction method comprising the steps of:
obtaining a three-dimensional medical image of a chest;
extracting a bronchial structure representing a structure of a bronchus or bronchi from the obtained three-dimensional medical image;
dividing, based on the divergence of the extracted bronchial structure, the bronchial structure into a plurality of divided bronchial structures, and obtaining a plurality of divided lung regions based on the plurality of divided bronchial structures;
generating, based on the plurality of divided lung regions, a distance image based on a distance between each voxel in an entire region excluding at least one of the plurality of divided lung regions and each of the plurality of divided lung regions; and
extracting, based on the generated distance image, a border non-existing region, which does not include any borders of the plurality of divided lung regions.

11. A non-transitory computer-readable recording medium storing therein a region extraction program for causing a computer function as:
a three-dimensional medical image obtainment unit that obtains a three-dimensional medical image of a chest;
a bronchial structure extraction unit that extracts a bronchial structure representing a structure of a bronchus or bronchi from the three-dimensional medical image obtained by the three-dimensional medical image obtainment unit;
a divided lung region obtainment unit that divides, based on the divergence of the bronchial structure extracted by the bronchial structure extraction unit, the bronchial structure into a plurality of divided bronchial structures, and obtains a plurality of divided lung regions based on the plurality of divided bronchial structures;
a distance image generation unit that generates, based on the plurality of divided lung regions, a distance image based on a distance between each voxel in an entire region excluding at least one of the plurality of divided lung regions and each of the plurality of divided lung regions; and
a border non-existing region extraction unit that extracts, based on the distance image generated by the distance image generation unit, a border non-existing region, which does not include any borders of the plurality of divided lung regions.

* * * * *